Aug. 26, 1924.                                                        1,506,061
W. HENKER
METHOD OF MOLDING HOLLOW OBJECTS
Filed Aug. 5, 1922
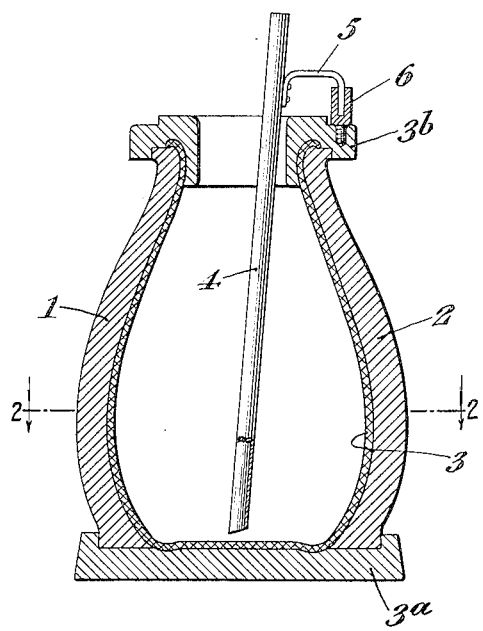
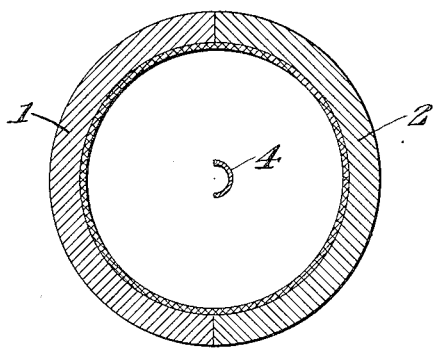
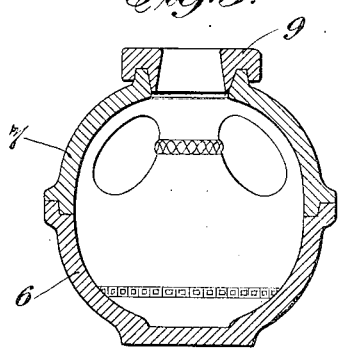
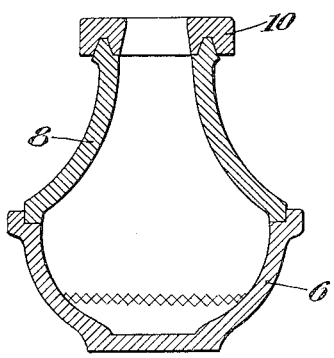
INVENTOR
Willy Henker
BY Prindle Wright & Small
ATTORNEYS Patented Aug. 26, 1924.

1,506,061

UNITED STATES PATENT OFFICE.

WILLY HENKER, OF BERLIN, GERMANY, ASSIGNOR TO ART INDUSTRIES, INC., A CORPORATION OF NEW YORK.

METHOD OF MOLDING HOLLOW OBJECTS.

Application filed August 5, 1922. Serial No. 579,957.

*To all whom it may concern:*

Be it known that I, WILLY HENKER, a citizen of Germany, a resident of Berlin, in the county of Brandenburg and State of Prussia, Germany, have invented a certain new and useful Improvement in Methods of Molding Hollow Objects, of which the following is a specification.

My invention relates to a process of making molded objects of many different kinds, and the product thereof, but it has relation especially to the production of such products from compositions containing sulphur and other ingredients to give the product the desired properties.

The object of my invention is to provide a process and a product thereof whereby objects of any desired character may be readily and quickly molded with a minimum of labor and cost and so as to obtain products having an attractive and artistic appearance, and which are also of a very durable character. The object of my invention is especially to mold such objects from compositions of this character in such a manner as to produce products substantially free from flaws and imperfections, and having a high gloss which is retained indefinitely. Again, a further object is to manufacture products of this character from a composition containing sulphur which melts at a comparatively low temperature and abrasive blastings from metal castings which blastings are preferably comprised of particles of sand combined with or coated by small particles of metal so that particles of metal are provided having a low enough specific gravity to remain suspended in the molten sulphur during the cooling of the composition while the sulphur is combining with portions of the metal, said composition containing. in addition, a carbonate of an alkali earth metal, such, for example, as magnesite or some similar material in order to make the composition stronger and harder.

Further objects of my invention will appear from the detailed description hereinafter.

While my invention is capable of embodiment in many different forms for the purpose of illustration I shall describe only certain forms thereof hereinafter and in connection with only one of the many different types of apparatus which may be used therewith, the same being shown in the accompanying drawings in which—

Figure 1 is a vertical section of a molding apparatus to be used in connection with my invention, Figure 2 is a horizontal section of the same, and Figures 3 and 4 show modifications thereof in vertical section.

In carrying out my invention I provide a mold of any desired character which may, for example, be comprised of two laterally separable parts 1 and 2 made of some metal as, for example, brass or iron, thus providing a mold having in the interior a cavity 3 in the shape of the object molded, as, for example, a vase. This may be provided with a removable bottom plate $3^a$ and a removable upper portion $3^b$. In order to prevent the melted material from splashing against the sides of the mold and thus causing the premature hardening of the splashings upon the sides of the mold, as well as the formation of air bubbles, which would result in the production of spots and imperfections in the product I provide a liquid guiding means such, for example, as a spout 4 which may be in the form of a trough or tube and which has attached to the upper end thereof a bent wire 5 so that it may be supported in a tube 6 secured to the top of the mold.

As shown in Figures 3 and 4, molds of different shapes may be provided by having a portion 6 that may be used interchangeably with portions 7 and 8 having removable upper portions 9 and 10 respectively.

The composition for the molding operation is now prepared by melting a mixture containing, for example, approximately 53 parts by weight of finely divided sulphur and approximately 47 parts by weight of the sand blastings from metal castings such, for example, as sand blastings from iron, brass or copper castings. These sand blastings are comprised of particles of sand each of which has attached thereto as a coating or otherwise, minute portions of the metal from which the casting was made. To this molten mass maintained at any desired temperature to produce a homogeneous liquid, but preferably at a temperature of about 122° C., there is added double the quantity of a melted mixture of approximately 45 parts by weight of pulverized magnesite and approximately 55 parts by weight of pulverized sulphur heated to a molten state but preferably to a temperature of 200° C. Preferably the second molten mixture is at a higher temperature than the first although this is not essential, as the composition containing magnesite is more viscous than the other composition to be mixed therewith. It will be understood that the metalliferous sand may be comprised of the mineral blastings of any desired character obtained by blasting any metal castings such as steel, iron, copper or brass castings with any finely divided abrasive material such, for example, as sand. Also, it will be understood that instead of the magnesite any carbonate of an alkali earth metal may be used as, for example, marble, dolomite, etc. It will also be understood that substantially any proportions of the ingredients referred to may be used.

This composition prepared as above is now introduced into the mold, which has been given a fine interior coating of a pure form of mineral oil, and which is preferably supported so as to be free from vibration in such a manner as to prevent any possibility of splashing, as, for example, by pouring slowly the liquid to gridually rise in the mold until it is filled. In this way, also, the material is prevented from running down the inside of the mold. If it is desired to produce effects having the appearance of marble-like designs therein, this can be accomplished by pouring the said two molten mixtures of sulphur and sand blastings on one hand and sulphur and magnesite on the other hand, alternately into the mold as desired. The pouring of the liquid as described into the mold will not only prevent any splashing which would produce blemishes on the surface of the finished product but will also prevent the presence of any air bubbles which would have the result of forming holes in the surface of the molded object. The liquid is now allowed to cool to some extent within the mold and preferably for a period of one minute until the heat conducted away by the metal mold 1 is sufficient to have hardened the melted liquid to the desired depth in the interior of the mold. The spout 4 is now withdrawn and the remainder of the liquid is poured out of the interior of the mold thus leaving a molded object of the desired thickness, which may be readily removed from the mold by separating it along the lines of sub-division of the particular mold. The molded object may now be finished by removing any traces of the lines of sub-divisioin of the mold. It will be found that the molded object has a very high gloss. If desired, the surface of the molded object may now be preserved against any change by polishing the same with a material which will leave an extremely thin coating of such a character as to prevent oxidation. For this purpose I may use any composition containing a resinous or waxy material and a solvent such, for example, as a composition containing 90% by weight of paraffin or bees wax and 10% by weight of rosin, the same being dissolved in enough turpentine or ether to make a creamy composition. Other resins may be used, as well as other waxes and other solvents, but I have found that the alcohol soluble resins will not serve the desired purpose of preserving the surface of the product. The plastic composition referred to is used by rubbing the surface of the molten product and then polishing the same by rubbing with any kind of fabric desired.

When desired, decorative inlays can be made in the molded objects by introducing inlays of thin metal, paper or celluloid, etc., which are glued to the interior of the mold before pouring in the molten material. These inlays can be subsequently worked to produce any desired design with the aid of carving, colors, etc.

In molding objects of this character it will always be found desirable to provide a hollow space in some portion of the object, as, for example, the cavity in the center of a vase, inasmuch as if the object were cast solid from any composition containing sulphur and mineral blastings of metal castings, whether the carbonate of an alkali earth metal were omitted or not, the great expansion in the final cooling of the central body of molten material would tend to result in disrupting the external portion thereof with the production of cracks. In my application Serial No. 579,958, filed August 5, 1922, method of molding objects and product thereof, I have described a method of molding objects by allowing a wall to form by cooling and thereupon to pour out the remaining molten material from the interior of the casting and closing the orifice.

While I have described my invention above in detail I wish it to be understood that many changes may be made therein without departing from the spirit of the same.

I claim:

1. The process which comprises molding an object by pouring a molten material into a mold while avoiding splashing of the molten material against the walls of the mold by introducing the molten material into the mold with a guiding means approaching the bottom of the mold, and pouring out the remainder of the liquid when the outer portion thereof has hardened.

2. The process which comprises molding an object by pouring a molten material containing sulphur, abrasive blastings of metal casings, and an alkali earth-metal carbonate, into a mold while avoiding splashing against the walls thereof, by introducing the molten material into the mold with a guiding means, and pouring out the remainder of the liquid when the outer portion adjacent the mold surfaces has hardened.

3. The process which comprises molding an object by pouring a molten material into a mold while avoiding splashing of the molten material against the walls of the mold with a trough approaching the bottom of the mold, and pouring out the remainder of the liquid when the outer portions thereof have hardened.

4. The process which comprises molding an object by pouring a molten material containing sulphur and abrasive blastings of metal castings into a mold while avoiding splashing of the molten material, by means of a guiding means, and pouring out the remainder of the liquid when the outer portions adjacent the mold surfaces have hardened.

5. The process which comprises molding an object by pouring a molten material containing sulphur and abrasive blastings of metallic materials into a mold while avoiding splashing of the molten material against the walls of the mold by guiding the material into close proximity with the walls, and pouring out the remainder of the liquid when the outer portions adjacent the mold have hardened.

In testimony that I claim the foregoing, I have hereunto set my hand this 5th day of July, 1922.

WILLY HENKER.